United States Patent
Lee et al.

(10) Patent No.: US 12,489,164 B2
(45) Date of Patent: Dec. 2, 2025

(54) BATTERY PACK AND VEHICLE COMPRISING SAME

(71) Applicant: LG Energy Solution, Ltd., Seoul (KR)

(72) Inventors: Tae-Kyeong Lee, Daejeon (KR); Sung-Hoon Woo, Daejeon (KR); Young-Il Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 499 days.

(21) Appl. No.: 18/019,387

(22) PCT Filed: Aug. 13, 2021

(86) PCT No.: PCT/KR2021/010837
§ 371 (c)(1),
(2) Date: Feb. 2, 2023

(87) PCT Pub. No.: WO2022/035295
PCT Pub. Date: Feb. 17, 2022

(65) Prior Publication Data
US 2023/0361404 A1    Nov. 9, 2023

(30) Foreign Application Priority Data
Aug. 14, 2020 (KR) .................. 10-2020-0102645

(51) Int. Cl.
*H01M 50/211* (2021.01)
*H01M 10/42* (2006.01)
(Continued)

(52) U.S. Cl.
CPC ..... *H01M 50/211* (2021.01); *H01M 10/4257* (2013.01); *H01M 50/249* (2021.01);
(Continued)

(58) Field of Classification Search
CPC ............ H01M 50/211; H01M 50/213; H01M 50/207; H01M 50/249; H01M 50/253;
(Continued)

(56) References Cited

U.S. PATENT DOCUMENTS

2007/0259263 A1* 11/2007 Shibuya ............. H01M 50/213
429/186
2013/0192914 A1    8/2013 Nakamori
(Continued)

FOREIGN PATENT DOCUMENTS

CN    208460828 U    2/2019
CN    209232838 U    8/2019
(Continued)

OTHER PUBLICATIONS

Extended European Search Report including Written Opinion for Application No. 21856301.3 dated Aug. 2, 2023, pp. 1-7.
(Continued)

Primary Examiner — Raymond Alejandro
(74) Attorney, Agent, or Firm — Lerner David LLP

(57) ABSTRACT

A battery pack according to an embodiment of the present disclosure includes: a plurality of battery modules; a tray including a mount plate on which the plurality of battery modules are seated, a front frame provided on an end portion in a longitudinal direction of the mount plate, and a rear frame provided on the other end portion in the longitudinal direction of the mount plate; a pair of side covers covering both end portions in a width direction of the tray; at least one module partition wall parallel to the front frame and the rear frame, and located between adjacent battery modules; and a battery energy management system (BEM) assembly including a BEM bracket having one end portion fastened to the at
(Continued)

least one module partition wall and the other end portion fastened to the rear frame, and a BEM mounted on the BEM bracket.

11 Claims, 8 Drawing Sheets

(51) Int. Cl.
*H01M 50/249* (2021.01)
*H01M 50/258* (2021.01)

(52) U.S. Cl.
CPC .. *H01M 50/258* (2021.01); *H01M 2010/4271* (2013.01); *H01M 2220/20* (2013.01)

(58) Field of Classification Search
CPC ............. H01M 50/242; H01M 50/258; H01M 50/262; H01M 10/4257; H01M 2010/4271; H01M 2220/20
See application file for complete search history.

(56) References Cited

U.S. PATENT DOCUMENTS

| | | | |
|---|---|---|---|
| 2015/0165926 A1 | 6/2015 | Kim et al. | |
| 2015/0295283 A1 | 10/2015 | Eom et al. | |
| 2016/0218333 A1* | 7/2016 | Takasaki | H01M 50/367 |
| 2017/0125777 A1 | 5/2017 | Lee et al. | |
| 2018/0105282 A1 | 4/2018 | Tweet et al. | |
| 2019/0259995 A1* | 8/2019 | Motohashi | H01M 50/271 |
| 2020/0280035 A1 | 9/2020 | Park et al. | |

FOREIGN PATENT DOCUMENTS

| | | |
|---|---|---|
| CN | 110854314 A | 2/2020 |
| CN | 210082990 U | 2/2020 |
| CN | 210200841 U | 3/2020 |
| CN | 111183532 A | 5/2020 |
| JP | 2003243049 A | 8/2003 |
| JP | 2012128983 A | 7/2012 |
| JP | 2016103491 A | 6/2016 |
| JP | 20182063 A | 1/2018 |
| JP | 2018172026 A | 11/2018 |
| JP | 2019129042 A | 8/2019 |
| KR | 20150068677 A | 6/2015 |
| KR | 20170052381 A | 5/2017 |
| KR | 101743701 B1 | 6/2017 |
| KR | 101926534 B1 | 12/2018 |
| KR | 102065096 B1 | 1/2020 |

OTHER PUBLICATIONS

International Search Report for Application No. PCT/KR2021/010837 mailed Nov. 23, 2021, pp. 1-3.

* cited by examiner

BATTERY PACK AND VEHICLE COMPRISING SAME

CROSS-REFERENCE TO RELATED APPLICATIONS

The present application is a national stage entry under 35 U.S.C. § 371 of International Application No. PCT/KR2021/010837, filed on Aug. 13, 2021, which claims priority to Korean Patent Application No. 10-2020-0102645, filed on Aug. 14, 2020, the disclosures of which are hereby incorporated herein by reference in their entireties.

TECHNICAL FIELD

The present disclosure relates to a battery pack and a vehicle including the same, and more particularly, to a battery pack having a structure capable of fastening a battery energy management system (BEM) assembly by using a module partition wall and a rear frame located in an inner space of a tray, and a vehicle including the battery pack.

BACKGROUND ART

As the demand for portable electronic products such as laptops, video cameras, and mobile terminals has recently rapidly increased and the development of electric vehicles, energy storage batteries, robots, satellites, etc. has begun in earnest, research on high-performance secondary batteries capable of repeated charge/discharge has been actively conducted.

Currently commercialized secondary batteries include nickel cadmium batteries, nickel hydride batteries, nickel zinc batteries, and lithium secondary batteries. Among them, lithium secondary batteries are in the spotlight because they have almost no memory effect compared to nickel-based secondary batteries, and thus have advantages of free charge/discharge, very low self-discharge rate, and high energy density.

A lithium secondary battery mainly uses a lithium-based oxide and a carbon material as a positive electrode active material and a negative electrode active material, respectively. Also, the lithium secondary battery includes an electrode assembly in which a positive electrode plate and a negative electrode plate to which the positive electrode active material and the negative electrode active material are respectively applied are located with a separator therebetween, and a casing, that is, a battery case, for sealing and accommodating the electrode assembly along with an electrolytic solution.

According to a shape of a casing, lithium secondary batteries may be classified into can-type secondary batteries in which an electrode assembly is received in a metal can, and pouch-type secondary batteries in which an electrode assembly is received in a pouch of an aluminum laminate sheet.

In particular, the demand for large-capacity battery packs applied to electric vehicles and the like has recently increased. Such large-capacity battery packs have problems in that a plurality of battery modules are accommodated in a narrow inner space to improve energy density, and thus it is difficult to secure a space for fixing a battery energy management system (BEM).

DISCLOSURE

Technical Problem

The present disclosure is designed to solve the problems of the related art, and therefore the present disclosure is directed to providing a structure for installing a battery energy management system (BEM) without significant change in a conventional battery pack structure.

However, technical problems to be solved by the present disclosure are not limited to the above-described technical problems and one of ordinary skill in the art will understand other technical problems from the following description.

Technical Solution

In one aspect of the present disclosure, there is provided a battery pack including: a plurality of battery modules; a tray including a mount plate on which the plurality of battery modules are seated, a front frame provided at an end portion in a longitudinal direction of the mount plate, and a rear frame provided at the other end portion in the longitudinal direction of the mount plate; a pair of side covers covering both end portions in a width direction of the tray; at least one module partition wall parallel to the front frame and the rear frame, and located between adjacent battery modules; and a battery energy management system (BEM) assembly including a BEM bracket having one end portion fastened to the module partition wall and the other end portion fastened to the rear frame, and a BEM mounted on the BEM bracket.

The plurality of battery modules may be respectively accommodated in a plurality of receiving spaces divided by the front frame, the rear frame, the pair of side covers, and the at least one module partition wall.

The BEM bracket may be located over the battery module located in a receiving space formed between the rear frame and the module partition wall adjacent to the rear frame.

The rear frame may include a supporting rib extending from an inner wall of the rear frame toward the inside of the tray, wherein the other end portion of the BEM bracket is fastened to the supporting rib.

A plurality of partition wall grooves may be formed in a top surface of the module partition wall, wherein one end portion of the BEM bracket is fastened to bottom surfaces of the plurality of partition wall grooves.

The BEM bracket may include: a pair of first brackets spaced apart from each other in a width direction of the battery pack; and a second bracket including a pair of sub-brackets located between the pair of first brackets and a plurality of connecting brackets for connecting the pair of sub-brackets.

Both end portions of the BEM in a longitudinal direction may be respectively fastened to the pair of first brackets.

The BEM may be seated on a seating surface formed by the pair of sub-brackets and the plurality of connecting brackets.

Each of the plurality of battery modules may include a fixing portion formed on at least one side.

Each of the plurality of battery modules may be fixed to at least one of the pair of side covers through the fixing portion.

In another aspect of the present disclosure, there is also provided a vehicle including at least one battery pack.

Advantageous Effects

According to the present disclosure, a structure for installing a battery energy management system (BEM) without significant change in a conventional battery pack structure may be provided. Also, according to the present disclosure, energy density may be improved by minimizing the size of a space required to install a BEM.

However, technical problems to be solved by the present disclosure are not limited to the above-described technical problems and one of ordinary skill in the art will understand other technical problems from the following description.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
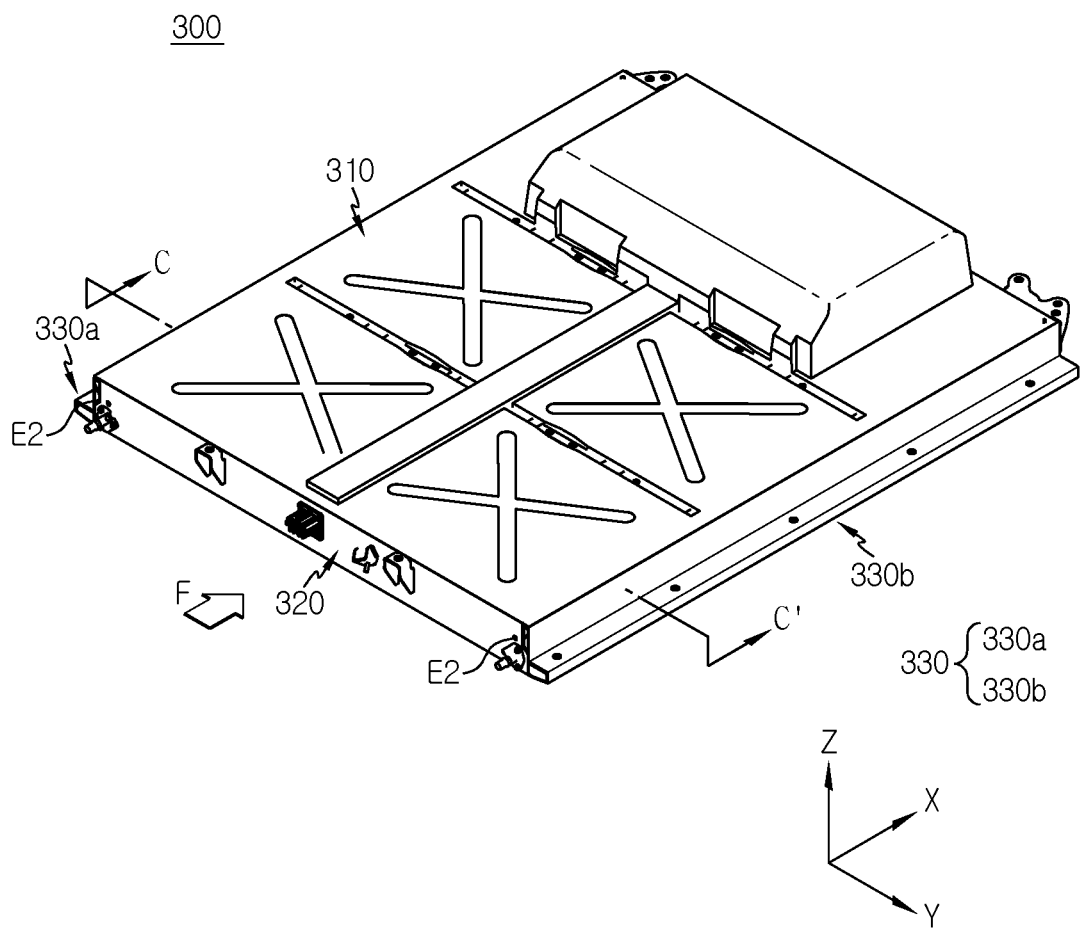
FIG. 1 is an assembled perspective view illustrating a battery pack according to an embodiment of the present disclosure.
Figure 2:
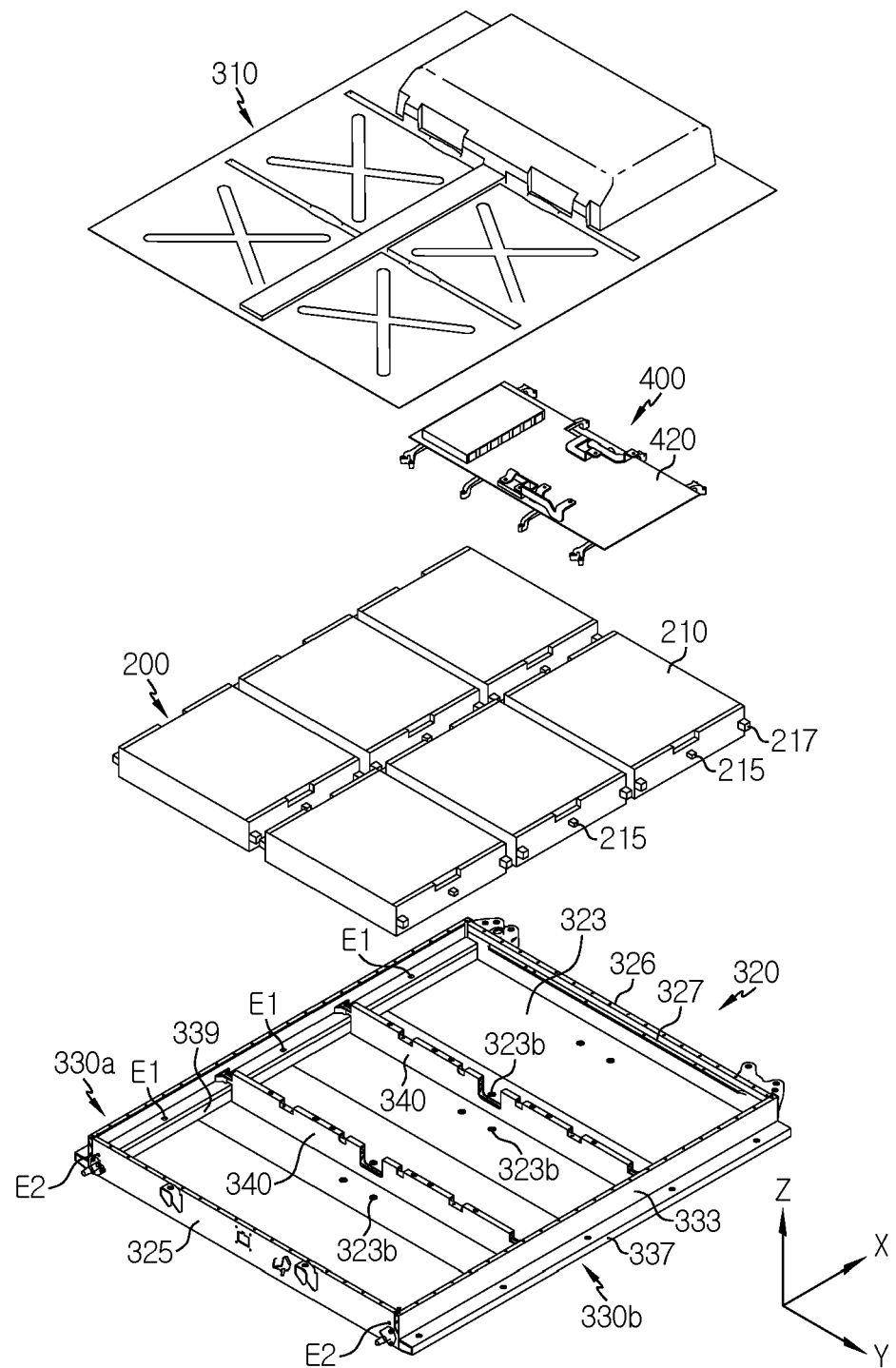
FIG. 2 is an exploded perspective view illustrating a battery pack according to an embodiment of the present disclosure.
Figure 3:
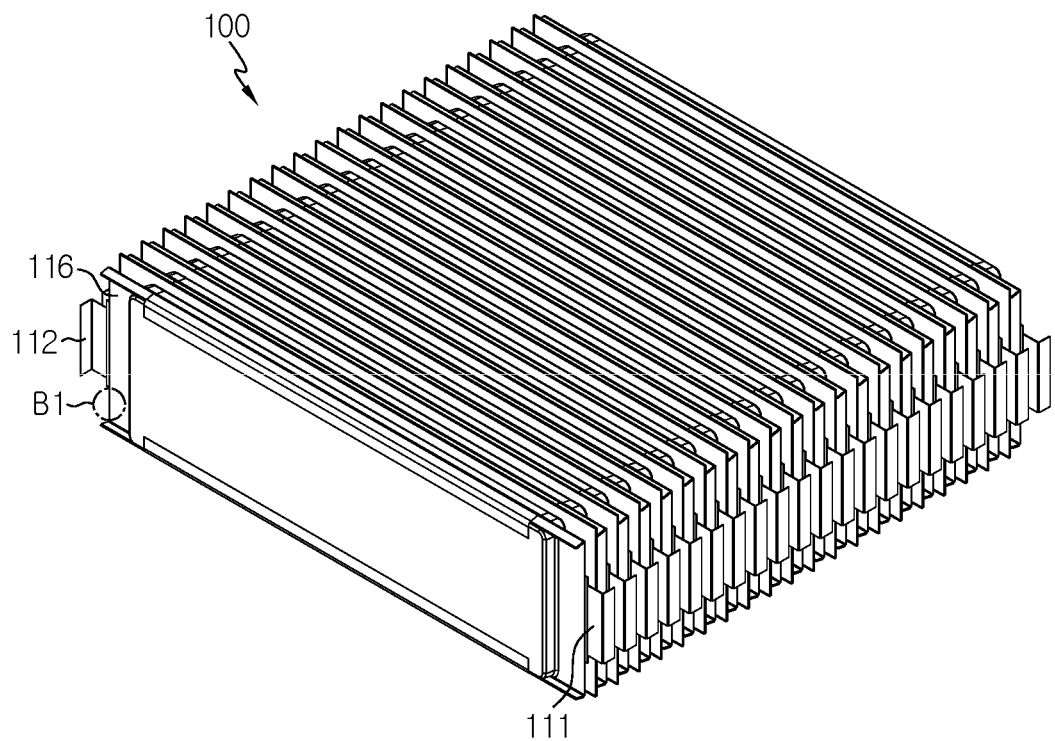
FIG. 3 is a perspective view illustrating a cell stack in which a plurality of secondary batteries applied to a battery pack are stacked according to an embodiment of the present disclosure.

Referring to FIGS. 1 through 3, a battery pack 300 according to an embodiment of the present disclosure includes a plurality of battery modules 200, a tray 320, a pair of side covers 330 (330a and 330b), and at least one module partition wall 340. The battery pack 300 may further include an upper cover 310. The tray 320 and the pair of side covers 330 may constitute one pack housing. Alternatively, the tray 320, the pair of side covers 330, and the upper cover 310 may constitute one pack housing.

In detail, the battery module 200 may include a plurality of secondary batteries 100. Each of the secondary batteries 100 may be a pouch-type secondary battery including an electrode assembly (not shown), an electrolytic solution (not shown), and a pouch case 116 in which the electrode assembly and the electrolytic solution are accommodated. For example, as shown in FIG. 3, when viewed in an F direction (see FIG. 1), inside one battery module 200, 21 pouch-type secondary batteries 100 that are stacked in a longitudinal direction (direction parallel to an X-axis) of the battery pack 300 may be accommodated in a module housing 210. However, this is merely an example, and the number of the secondary batteries 100 may vary according to required capacity and voltage.

Also, as shown in FIG. 3, a positive electrode lead 112 and a negative electrode lead 111 may be drawn out in opposite directions in a width direction (direction parallel to a Y-axis) of the battery pack 300. That is, the positive electrode lead 112 may be provided at an end portion with respect to the center of the secondary battery 100. Also, the negative electrode lead 111 may be provided at the other end portion with respect to the center of the secondary battery 100.

The secondary battery 100 may be provided so that a body is erected perpendicular to a horizontal surface (X-Y plane). The body of the secondary battery 100 may longitudinally extend in the width direction (direction parallel to the Y-axis) of the battery pack 300. Also, the plurality of secondary batteries 100 may be configured to, when abnormality such as fire or thermal runaway occurs, discharge gas to one side and/or the other side in the width direction of the battery pack 300. For example, when the secondary battery 100 is a pouch-type battery cell, a portion B1 of a sealing portion on a side or the other side in a longitudinal direction of the pouch case 116 may have a weak sealing force. Alternatively, the portion of the sealing portion on the side or the other side in the longitudinal direction of the pouch may have a sealing area less than that of the other portion.

Accordingly, when abnormality occurs, the plurality of secondary batteries 100 may discharge gas to one side and/or the other side in the longitudinal direction, and thus may discharge the gas in the battery module 200 in a desired direction (direction toward a discharge port described below). Accordingly, gas may be smoothly discharged to the outside without being stagnant inside the battery module 200, and thus a secondary explosion or a larger fire inside the battery module 200 may be effectively prevented.

However, only the pouch-type battery cell 100 may not be applied to the battery pack 300 according to the present disclosure, and various types of battery cells known at the time of filing the present application may be employed.

The battery pack 300 may include at least one bus bar (not shown) configured to electrically connect the plurality of secondary batteries 100 to one another. In detail, the bus bar may include a conductive metal, for example, copper, aluminum, or nickel.

Furthermore, the battery pack 300 may include a wire-type bus bar (not shown) for electrically connecting the plurality of battery modules 200 to one another.

Each of the plurality of battery modules 200 may include a discharge port 215. The discharge port 215 may have an opening through which gas generated inside the battery module 200 is discharged to the outside. It is preferable that the discharge port 215 is formed only on an end portion of the battery module 200. It is preferable that the discharge port 215 is formed only on an end portion close to an outer surface of the battery pack 300 from among both end portions in a longitudinal direction (direction parallel to the Y-axis) of the battery module 200. This is to prevent a phenomenon where temperature rise is accelerated when a pair of battery modules 200 facing each other discharge gas toward each other.

That is, in the battery pack 300 according to the present disclosure, a pair of battery modules 200 are located on the tray 320 to face each other in the width direction (direction parallel to the Y-axis) of the battery pack 300, and two or more battery modules 200 are continuously arranged in the longitudinal direction (direction parallel to the X-axis) of the battery pack 300. When the battery pack 300 has a structure in which the battery modules 200 facing each other discharge gas toward each other, a temperature inside the battery pack 300 may rise. Accordingly, a position of the discharge port 215 is limited to a position at which high-temperature gas may be discharged to the outside of the battery pack 300.

The discharge port 215 may have a tubular shape protruding toward the side cover 330. A tubular end portion of the discharge port 215 may be connected to an inlet E1 to communicate with the inside of the side cover 330.

The plurality of battery modules 200 are mounted on the tray 320. The tray 320 may include a mount plate 323 extending in a horizontal direction (direction parallel to an X-Y plane) and allowing the battery module 200 to be seated thereon. Also, the tray 320 may include a base plate 324 coupled to a lower portion of the mount plate 323. The tray 320 may include a front frame 325 and a rear frame 326 each having a plate shape erected in an up-down direction (direction parallel to a Z-axis). The front frame 325 may be provided on an end portion in a longitudinal direction (direction parallel to the X-axis) of the mount plate 323. The rear frame 326 may be provided on the other end portion in the longitudinal direction (direction parallel to the X-axis) of the mount plate 323.

The tray 320 may include an outlet E2 through which gas is discharged to the outside. For example, as shown in FIG. 2, the outlet E2 may be formed on both end portions in a longitudinal direction (direction parallel to the Y-axis) of the front frame 325. The outlet E2 may be open so that the inside and the outside of the battery pack 300 communicate with each other.

The upper cover 310 may be coupled to the top of the tray 320. The upper cover 310 has a size large enough to cover all of the plurality of battery modules 200 mounted on the tray 320.

Figure 4:
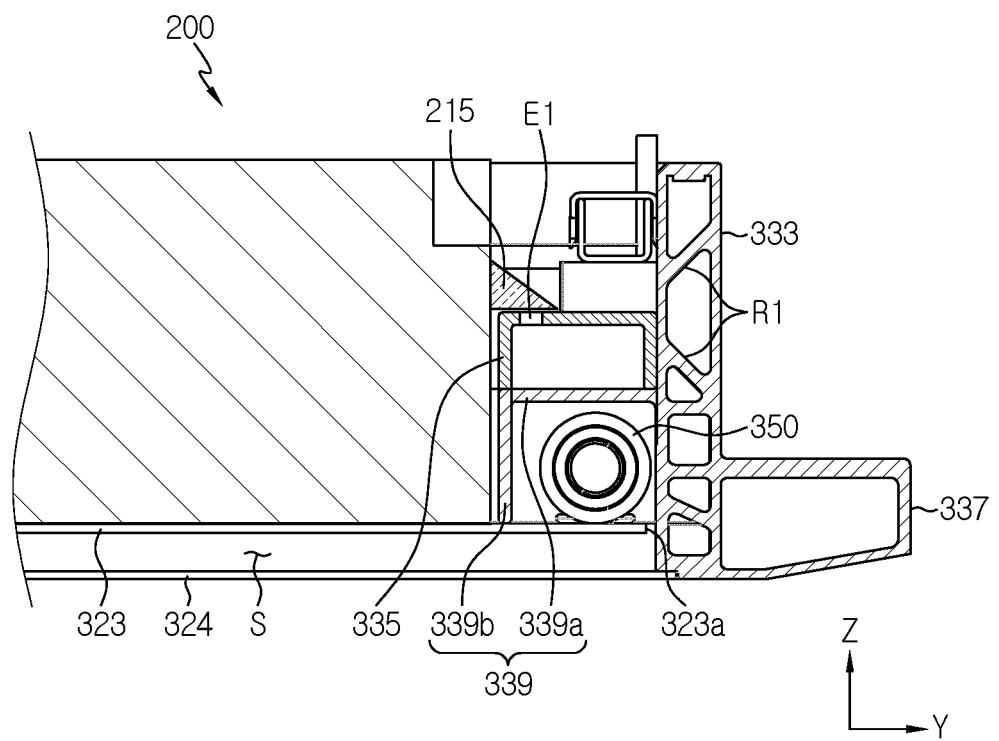
FIG. 4 is a partial cross-sectional view taken along line C-C of the battery pack of FIG. 1.

Referring to FIG. 4 together with FIG. 2, the side cover 330 may longitudinally extend in one direction (Y-axis direction). The side cover 330 may be formed by using extrusion molding. An end portion in a longitudinal direction (direction parallel to the X-axis) of the side cover 330 may be coupled to the front frame 325. The other end portion in the longitudinal direction of the side cover 330 may be coupled to the rear frame 326.

Furthermore, the side covers 330 may be located on an end portion and the other end portion in a width direction (direction parallel to the Y-axis) of the mount plate 323 of the tray 320. For example, as shown in FIGS. 2 and 4, two side covers 330 may include main body portions 333 respectively located on an end portion and the other end portion in the width direction of the mount plate 323. Accordingly, the main body portions 333 may function as a left wall and a right wall of the battery pack 300. The main body portions 333 may have a shape extending in a front-rear direction (direction parallel to the X-axis). For example, the main body portions 333 may have a plate shape extending in the front-rear direction through extrusion molding. The main body portions 333 may be erected in the up-down direction (direction parallel to the Z-axis). The main body portions 333 may have a hollow structure with an empty inside.

Also, the side cover 330 may include the inlet E1 formed by opening a portion. For example, the inlet E1 may be formed by opening a portion of a gas discharge portion 335 described below. The inside and the outside of the side cover 330 communicate with each other through the inlet E1. Each of a plurality of inlets E1 may be connected to the discharge port 215. That is, the inlet E1 faces the opening of the discharge port 215, and thus a gas passage formed in the gas discharge portion 335 and the discharge port 215 communicate with each other.

Furthermore, the gas discharge portion 335 may have a shape extending in one direction to transfer gas introduced from the inlet E1 to the outlet E2. The gas discharge portion 335 may be formed on a side of the main body portion 333. The gas discharge portion 335 may have a shape extending from a side of the main body portion 333 to the battery module 200. The gas discharge portion 335 may have a tubular shape extending in the front-rear direction and having an empty inside through an extrusion method. For example, as shown in FIG. 2, each of two side covers 330 may include the gas discharge portion 335, and the gas discharge portion 335 may extend in the front-rear direction. A front end portion of the gas discharge portion 335, that is, an end portion in the longitudinal direction (direction parallel to the X-axis), may be connected to the outlet E2 provided in the front frame 325.

The gas discharge portion 335 may be located over a pipe receiver 339 described below. Accordingly, the gas discharge portion 335 may be provided in an empty space of the battery pack 300 in the up-down direction (Z-axis direction), and thus the energy density of the battery pack 300 may be improved.

As such, the battery pack 300 according to the present disclosure includes the main body portions 333 longitudinally extending in one direction and respectively located on a side and the other side of the tray 320, the plurality of inlets E1 formed by opening portions and each connected to the discharge port 215, and the pair of side covers 330a, 330b each including the gas discharge portion 335 configured to transfer gas introduced from the inlet E1 to the outlet E2. Accordingly, the battery pack 300 according to the present disclosure may discharge high-temperature gas generated due to abnormality such as fire or thermal runaway in any one of the plurality of battery modules 200 to the outside through the gas discharge portion 335 without increasing a temperature of an adjacent battery module 200, thereby improving safety in the use of the battery pack 300.

The module partition wall 340 is parallel to the front frame 325 and the rear frame 326, and is located between adjacent battery modules 200. The module partition wall 340 divides an inner receiving space of the tray 320 along with the front frame 325, the rear frame 326, and the pair of side covers 330. The plurality of battery modules 200 may be respectively accommodated in a plurality of receiving spaces divided by the front frame 325, the rear frame 326, and the pair of side covers 330. The module partition wall 340 blocks heat transfer between adjacent battery modules 200 in the longitudinal direction (direction parallel to the X-axis) of the battery pack 300, and prevents movement of the battery module 200 in the longitudinal direction of the battery pack 300.

As described above, according to the present disclosure, because high-temperature gas generated from the battery module 200 may be transferred to the side cover 330 located opposite to an adjacent battery module 200, temperature rise of the adjacent battery module 200 due to the high-temperature gas may be minimized. Accordingly, when fire or thermal runaway occurs in one battery module 200, propagation of the thermal runaway or fire to adjacent battery modules 200 may be effectively prevented.

Furthermore, because the side covers 330 are located on a side and the other side in the width direction of the tray 320, the plurality of battery modules 200 may be protected from impact in the front-rear direction and a left-right direction. Accordingly, the stability of the battery pack 300 may be increased.

Figure 5:
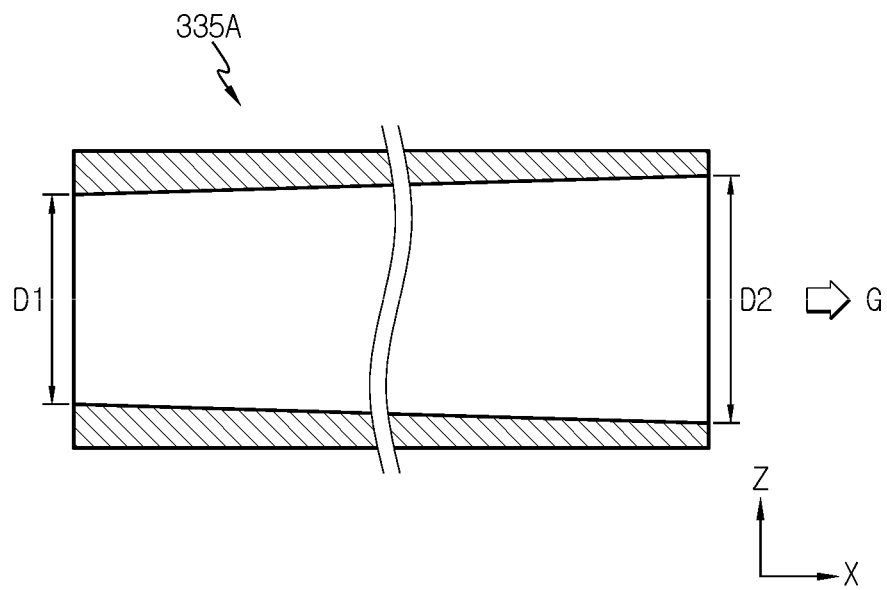
FIG. 5 is a partial cross-sectional view illustrating a gas discharge passage of a battery pack according to an embodiment of the present disclosure.

FIG. 5 is a partial cross-sectional view illustrating an appearance of a gas discharge portion of a battery pack according to an embodiment of the present disclosure.

Referring to FIG. 5 together with FIGS. 2 and 4, a gas discharge portion 335A applied to the present disclosure may be formed so that a cross-sectional area of an inner tube increases toward the outlet E2 of the tray 320. That is, in the gas discharge portion 335A, an inner diameter D1 of the inner tube located far from the outlet E2 of the tray 320 may be less than an inner diameter D2 of the inner tube located close to the outlet E2.

Accordingly, the internal pressure of a portion of the gas discharge portion 335A close to the outlet E2 may be less that of a portion far from the outlet E2. Accordingly, gas introduced into the gas discharge portion 335A may be guided to move to the outlet E2 of the gas discharge portion 335A where relatively low pressure is created.

According to this configuration of the present disclosure, gas may be smoothly discharged, thereby improving safety in the use of the battery pack 300.

Referring back to FIG. 4 together with FIG. 2, an inner space surrounded by an outer wall may be formed in the main body portion 333 of the side cover 330. A reinforcing rib R1 extending from an inner surface to the other inner surface may be provided in the inner space. For example, as shown in FIG. 4, the inner space surrounded by the outer wall may be formed inside the main body portion 333 of the side cover 330. At least one reinforcing rib R1 may be provided in the inner space to extend from an inner surface to the other inner surface.

The reinforcing rib R1 may longitudinally extend from an end portion to the other end portion in a longitudinal direction (direction parallel to the X-axis) of the main body portion 333. The reinforcing rib R1 may be provided on the gas discharge portion 335, a mount portion 337 described below, and the pipe receiver 339 as well as the main body portion 333 of the side cover 330. That is, the gas discharge portion 335, the mount portion 337, and the pipe receiver 339 which are elements of the side cover 330, may protect the battery module 200 and other elements by securing additional rigidity through the reinforcing rib R1 when external impact of the battery pack 300 occurs.

As such, according to the present disclosure, because the reinforcing rib R1 is formed in the inner space of the side cover 330, the mechanical rigidity of the side cover 330 may be effectively increased. Accordingly, the battery pack 300 may safely protect the plurality of battery modules 200 and other elements from external impact in the left-right direction and the front-rear direction.

Figure 6:
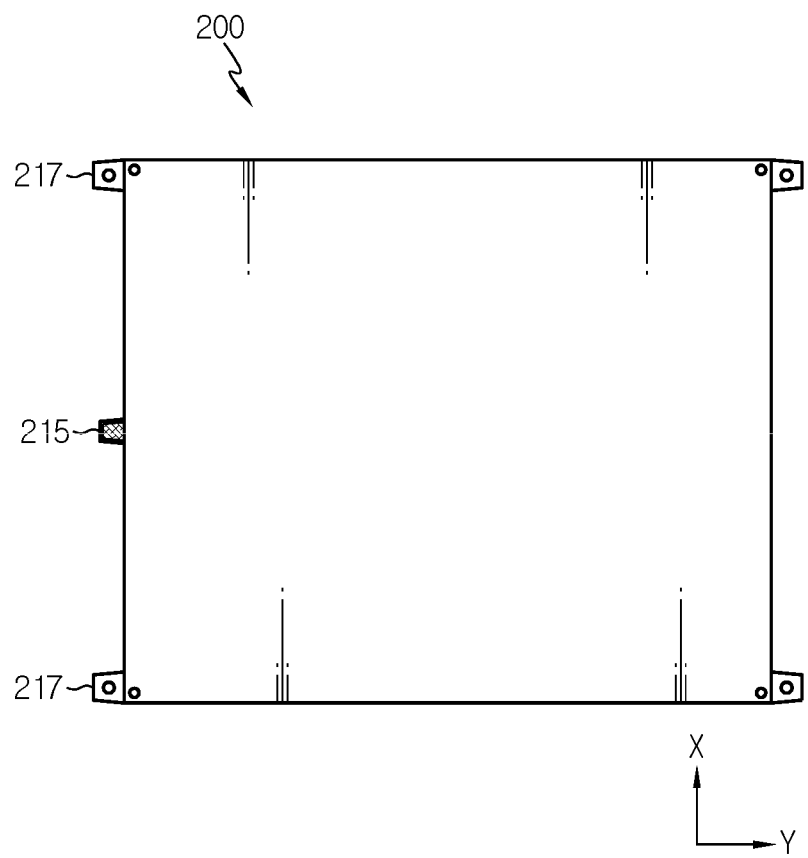
FIG. 6 is a bottom view illustrating a battery module applied to a battery pack according to an embodiment of the present disclosure.

FIG. 6 is a bottom view illustrating a battery module of a battery pack according to an embodiment of the present disclosure.

Referring back to FIGS. 2 and 6, the battery module 200 of the present disclosure may include the module housing 210. The module housing 210 may have an inner space in which the plurality of secondary batteries 100 are accommodated. The module housing 210 may include a fixing portion 217 to be coupled to the side cover 330. The fixing portion 217 may be provided, for example, on a side and the other side in a longitudinal direction (direction parallel to the Y-axis) of the module housing 210. Each of the plurality of battery modules 200 may be fixed to at least one of the pair of side covers 330 through the fixing portion 217.

A coupling hole may be formed in the fixing portion 217. A fastening hole may be formed in the side cover 330 at a position corresponding to the coupling hole. In detail, the fastening hole may be formed in the gas discharge portion 335 of the side cover 330. That is, a plurality of fastening holes and the inlets E1 may be formed in a top surface of the gas discharge portion 335 to be spaced apart from each other in a longitudinal direction (direction parallel to the X-axis) of the gas discharge portion 335.

A pair of outer fixing portions 217 provided on a pair of battery modules 200 facing each other may be coupled to the gas discharge portion 335 by using a fastening bolt (not shown) inserted into the fastening hole and the coupling hole.

As such, in the present disclosure, the battery module 200 and the tray 320 may be fastened to each other by using a method of indirectly fastening the battery module 200 by using a separate structure provided on the mount plate 323, instead of a method of directly fastening the battery module 200 to a bottom surface (floor surface) of the tray 320, that is, the mount plate 323. Accordingly, concentration of stress on the bottom surface of the tray 320 due to the fastening between the battery module 200 and the tray 320 may be prevented, and thus the loss of a coolant flowing through a cooling fluid passage formed in the bottom surface of the tray 320 due to external impact which causes cooling performance degradation may be prevented. Also, when the coolant flowing through the cooling fluid passage is cooling water, the risk of a short-circuit due to leakage of the cooling water may also be eliminated.

That is, the battery pack 300 according to the present disclosure may include a coolant hole 323b formed in the mount plate 323 constituting the bottom surface of the tray 320, and the bottom surface of the battery module 200 may be connected to the coolant hole 323b to receive and discharge the coolant. That is, the coolant hole 323b may communicate with a coolant passage (not shown) formed in the mount plate 232 constituting the bottom surface of the tray 320, and the coolant passage communicates with a cooling pipe 350 described below.

Referring back to FIGS. 1, 2, and 4, the battery pack 300 may further include the cooling pipe 350 inside which a coolant flows. The coolant may be, for example, cooling water.

Also, the side cover 330 includes the pipe receiver 339 inside which the cooling pipe 350 is accommodated. The pipe receiver 339 may have an outer wall formed to surround the cooling pipe 350. For example, as shown in FIG. 4, the outer wall of the pipe receiver 339 may include a horizontal plate 339a extending inward from an inner wall of the main body portion 333 and a vertical plate 339b extending downward from an end portion of the horizontal plate 339a. The horizontal plate 339a and the vertical plate 339b may be individually provided and fastened to each other by using welding or the like, or may be integrally formed with each other.

As such, according to the present disclosure, because the side cover 330 includes the pipe receiver 339 inside which the cooling pipe 350 is accommodated, damage to the cooling pipe 350 due to external impact may be prevented.

Referring back to FIG. 4, the tray 320 may include a temporary storage S. In detail, when the temporary storage S may be configured so that when a coolant leaks out from the cooling pipe 350, the leaking coolant flows into the temporary storage S. For example, as shown in FIG. 4, the temporary storage S may be formed in a space between the mount plate 323 and the base plate 324.

An end portion 323a in the longitudinal direction of the mount plate 323 may be spaced apart from the main body portion 333 of the side cover 330, to provide a passage through which leaking cooling water may flow into the temporary storage S. That is, when a coolant leaks out of the cooling pipe 350, the leaking coolant may flow into the temporary storage S through a gap between the end portion 323a of the mount plate 323 and the side cover 330.

As such, because the tray 320 includes the temporary storage S configured to allow a coolant leaking out of the cooling pipe 350 to flow into the temporary storage S, the leaking coolant may be prevented from being stagnant in a receiving space of the battery module 200 or from being introduced into the battery module 200, thereby preventing a short-circuit of the battery module 200 due to the coolant.

Referring back to FIG. 2, the side cover 330 may further include the mount portion 337. The mount portion 337 may be provided outside the main body portion 333 to be coupled to an external device. A fastening structure may be formed so that the mount portion 337 is coupled to an external device. For example, the mount portion 337 may be coupled to a body of a vehicle. A bolting hole for inserting a bolt may be formed in the mount portion 337.

As such, according to the present disclosure, because the mount portion 337 is further included, the battery pack 300 may be stably fixed to an external device such as a body of a vehicle.

Also, the mount portion 337 may be configured to protect the plurality of battery modules 200 located thereinside from external impact. To this end, the mount portion 337 may protrude outward from the main body portion 333. The mount portion 337 may have a hollow structure with an empty inside. That is, the mount portion 337 may protrude outward to, when impact is applied from a side of the battery pack 300, absorb or respond to the impact.

Figure 7:
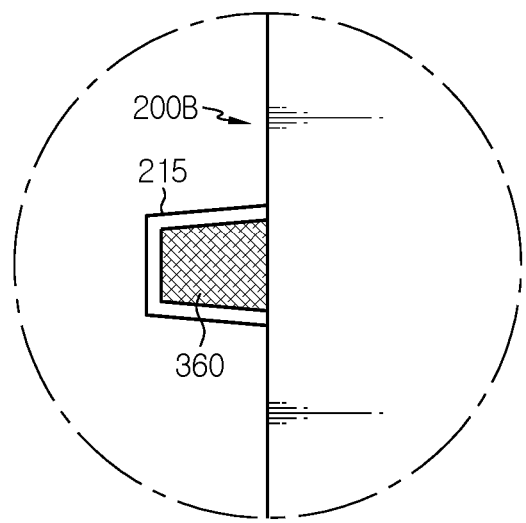
FIG. 7 is an enlarged bottom view illustrating a discharge port of FIG. 6.
Figure 8:
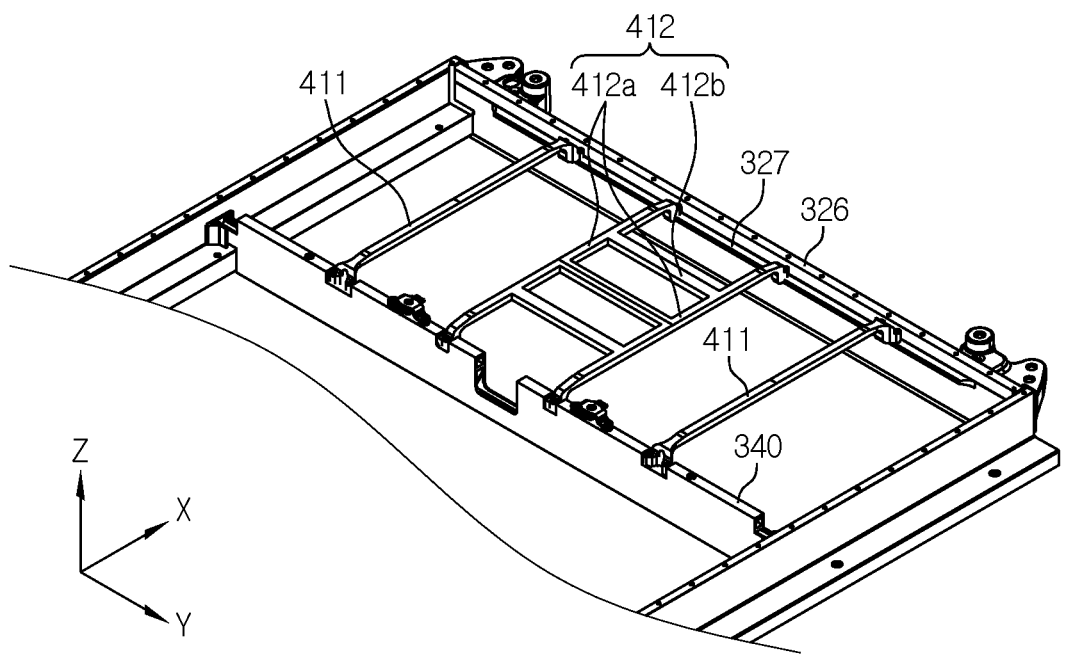
FIGS. 8 through 10 are views illustrating a coupling structure between a battery energy management system (BEM) bracket and a pack housing of the present disclosure.
Figure 9:
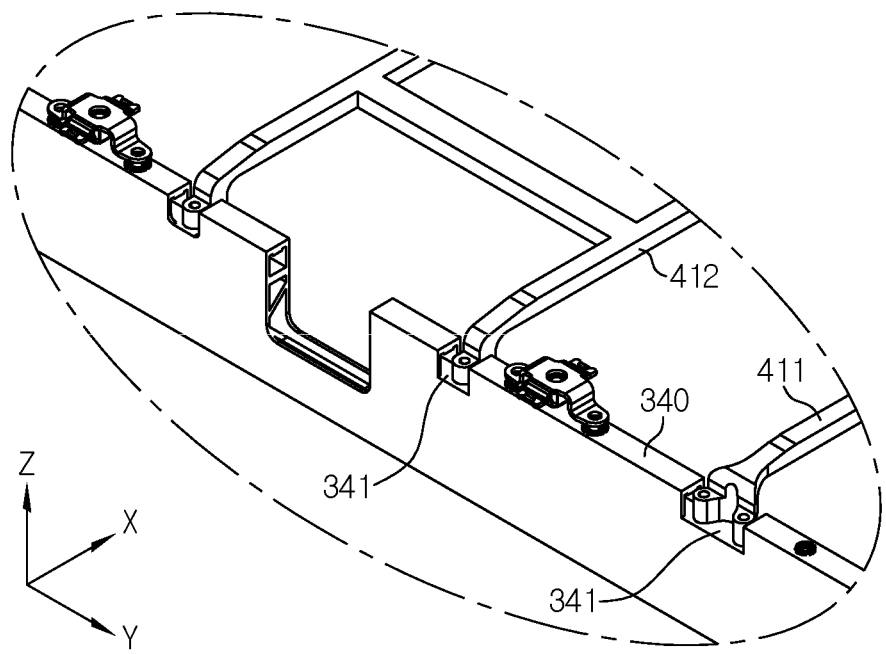
Figure 10:
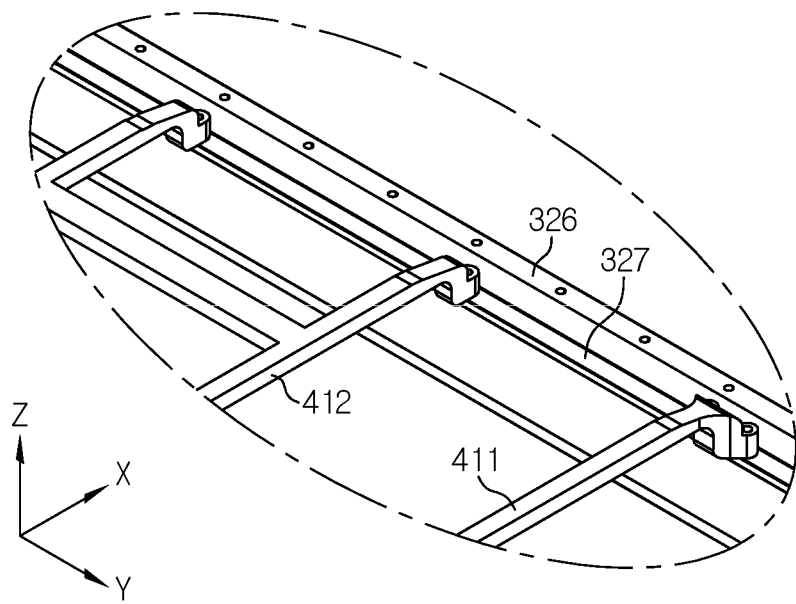
Figure 11:
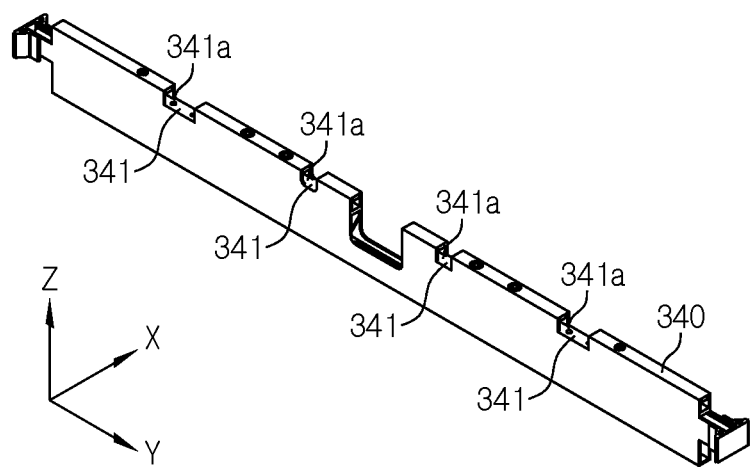
FIG. 11 is a view illustrating a module partition wall of the present disclosure.
Figure 12:
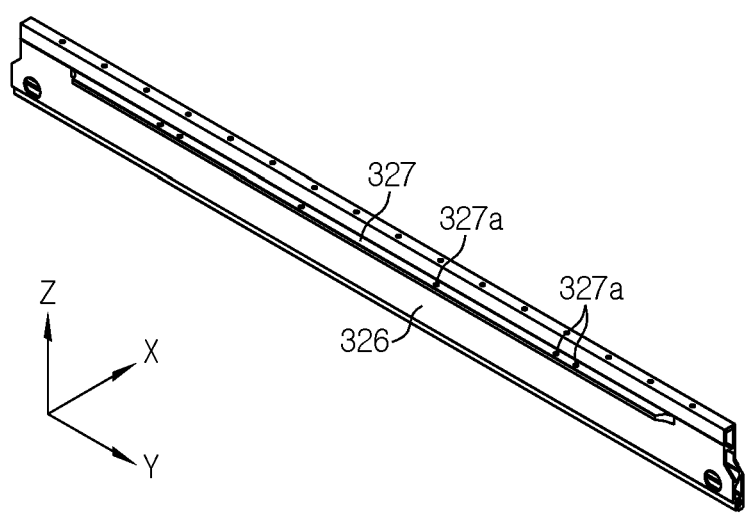
FIG. 12 is a view illustrating a rear frame of the present disclosure.
Figure 13:
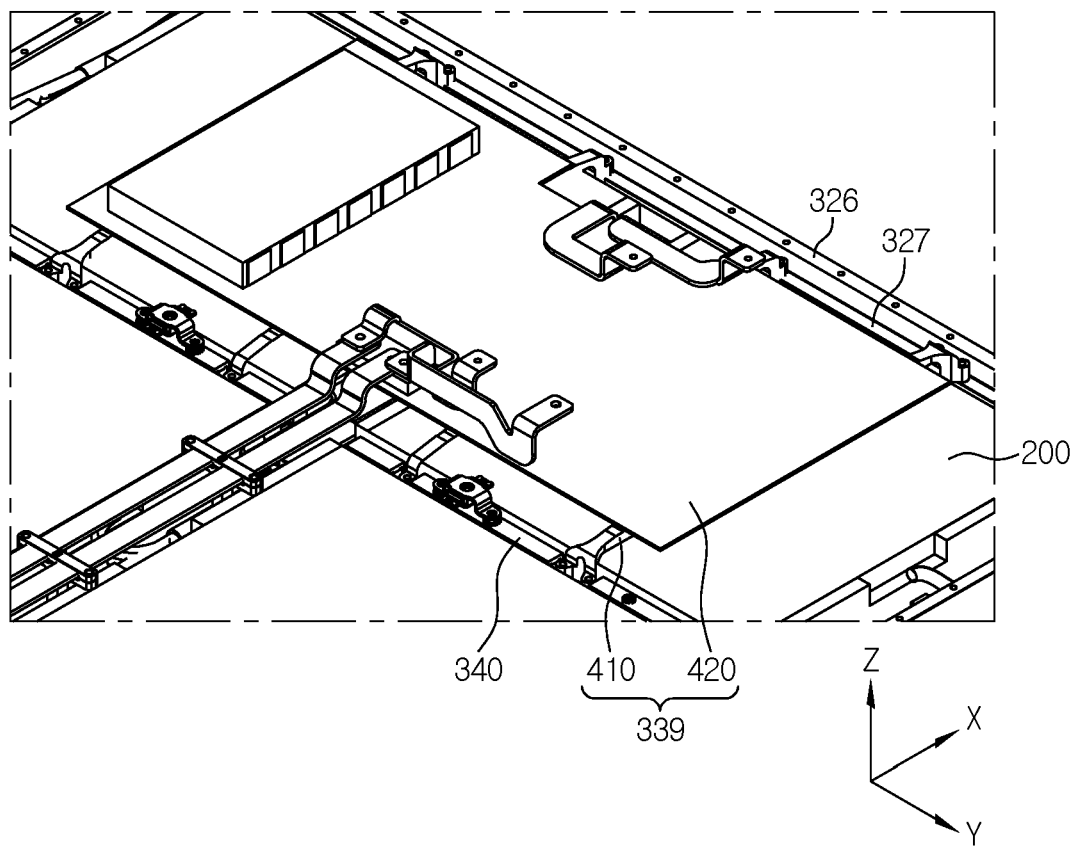
FIG. 13 is a view illustrating a coupling structure between a BEM assembly and a pack housing of the present disclosure.

Referring to FIG. 7 together with FIGS. 4 and 6, in a battery module 200B applied to a battery pack according to another embodiment of the present disclosure, a stopper 360 is provided on the discharge port 215. The stopper 360 may seal an outlet of the discharge port 215 below a certain temperature. The stopper 360 may be configured to be melted and lost at the certain temperature or higher. For example, the stopper 360 may include a material whose melting point is equal to or higher than 200° C. For example, the stopper 360 may include a paraffin material. The stopper 360 may be melted and lost, for example, at 200° C., to open the discharge port 215.

As such, because the battery module 200B of the present disclosure includes the stopper 360 configured to seal the discharge port 215 below a certain temperature and open the discharge port 215 by being melted and lost at the certain temperature or higher, high-temperature gas of the battery module 200B in which fire or thermal runaway occurs may cause the stopper 360 to be melted and lost, and thus the discharge port 215 may be opened to discharge the high-temperature gas. Because the discharge port 215 may be sealed in a normal use state in which an internal temperature is maintained at the certain temperature or higher, an external material (particularly, a conductive material) may be prevented from being introduced into the battery module 200B.

Furthermore, because the battery module 200B of the present disclosure uses the stopper 360, when high-temperature gas is discharged from the battery module 200B in which fire or thermal runaway occurs, the gas moving to the gas discharge portion 335 may be prevented from being introduced into the battery module 200B through the discharge portion 215 of another adjacent battery module 200B.

Referring to FIGS. 8 through 13 together with FIG. 2, a BEM assembly 400 includes a BEM bracket 410 and a BEM 420.

For example, an end portion of the BEM bracket 410 may be fastened to the module partition wall 340 and the other end portion of the BEM bracket 410 may be fastened to the rear frame 326. In detail, a plurality of partition wall grooves 341 may be formed in a top surface of the module partition wall 340, and an end portion of the BEM bracket 410 may be fastened to bottom surfaces (floor surfaces) of the partition wall grooves 341. Also, the rear frame 326 may include a supporting rib 327 extending inward from an inner wall of the rear frame 326, and the other end portion of the BEM bracket 410 may be fastened to the supporting rib 327.

The BEM bracket 410 may include a pair of first brackets 411, and a second bracket 412 located between the pair of first brackets 411. In this case, the pair of first brackets 411 are spaced apart from each other in the width direction (direction parallel to the Y-axis) of the battery pack 300. Also, the second bracket 412 may include a pair of sub-brackets 412a located between the pair of first brackets 411 and a plurality of connecting brackets 412b for connecting the pair of sub-brackets 412a.

An end portion in a longitudinal direction (direction parallel to the X-axis) of each of the first bracket 411 and the sub-bracket 412a may be bolted to the module partition wall 420 by using a partition wall hole 421a formed in a bottom surface of a partition wall groove 421. Also, the other end portion in the longitudinal direction (direction parallel to the X-axis) of each of the first bracket 411 and the sub-bracket 412a may be bolted to the supporting rib 327 by using a rib hole 327a formed in the supporting rib 327.

The BEM bracket 410 is located over the battery module 100 located in a receiving space formed between the rear frame 326 and the module partition wall 340 adjacent to the rear frame 326. The BEM bracket 410 may be formed to have, for example, a substantially arcuate shape that is curved upward.

In detail, each of the first bracket 411 and the sub-bracket 412a may be formed to have, for example, a substantially arcuate shape that is curved upward. The first bracket 411 and the sub-bracket 412a may be located over the battery module 200, and thus the BEM 420 may be upwardly spaced apart from the battery module 200.

The BEM 420 may be electrically connected to the plurality of battery modules 200, and may also be electrically connected to a sensor (not shown) located inside the tray 320. The BEM 420 controls charging/discharging of the battery pack 300 by referring to a driving condition of a vehicle to which the battery pack 300 is applied, a state of charge of the battery module 200, a temperature inside the battery pack 300, etc.

Although not shown, both end portions of the BEM 420 in a longitudinal direction may be respectively fastened to the pair of first brackets 411. Also, the BEM 420 may be seated on a seating surface formed by the pair of sub-brackets 412*a* and the plurality of connecting brackets 412*b*. That is, the second bracket 412 may function to form the seating surface on which the BEM 420 is seated, and the first bracket 411 may function to tightly fix the BEM 420 by being fastened to the both end portions in the longitudinal direction of the seated BEM 420. The second bracket 412 may not be coupled to the BEM 420 and may function only as a support for supporting the BEM 420.

As such, the battery pack 300 according to the present disclosure has a structure in which the BEM 420 may be fastened by using the module partition wall 340 and the rear frame 326 provided in an inner space of the pack housing. That is, the battery pack 300 according to the present disclosure does not cause a loss of energy density due to the introduction of a separate structure for installing the BEM 420.

In particular, the BEM bracket 410 of the present disclosure may be provided over the battery module 100 by using a structure provided in the tray 320, and thus a receiving space inside the tray 320 may be fully used as a space for accommodating the battery module 100. Accordingly, the battery pack 300 according to the present disclosure may maximize the effect of improving energy density.

A vehicle according to an embodiment of the present disclosure may be an electric vehicle or a hybrid vehicle, and includes at least one battery pack 300 according to the present disclosure as described above. That is, the vehicle according to an embodiment of the present disclosure may mount the battery pack 300 according to an embodiment of the present disclosure in a body of the vehicle. In this case, the side cover 330 may be coupled to the body of the vehicle.

It will be understood by one of ordinary skill in the art that when terms indicating directions such as upper, lower, left, right, front, and rear are used, these terms are only for convenience of explanation and may vary according to a position of an target object, a position of an observer, etc.

The present disclosure has been described in detail. However, it should be understood that the detailed description and specific examples, while indicating preferred embodiments of the present disclosure, are given by way of illustration only, since various changes and modifications within the scope of the present disclosure will become apparent to those skilled in the art from this detailed description.

What is claimed is:

1. A battery pack comprising:
    a plurality of battery modules;
    a tray comprising a mount plate on which the plurality of battery modules are seated, a front frame provided at a first end portion in a longitudinal direction of the mount plate, and a rear frame provided at a second end portion in the longitudinal direction of the mount plate opposite from the first end portion;
    a pair of side covers covering both third and fourth opposite end portions in a width direction of the tray;
    at least one module partition wall extending in the width direction parallel to the front frame and the rear frame, each of the at least one module partition wall located between adjacent ones of the battery modules; and
    a battery energy management system (BEM) assembly comprising a BEM bracket having a first end portion fastened to a first one of the at least one the module partition wall and a second end portion fastened to the rear frame, and a BEM mounted on the BEM bracket.

2. The battery pack of claim 1, wherein the plurality of battery modules are respectively accommodated in a plurality of receiving spaces divided from one another by the at least one module partition wall.

3. The battery pack of claim 2, wherein the BEM bracket is located overlying one or more of the battery modules located in a-a first one of the receiving spaces bounded by the rear frame and the first one of the at least one module partition wall located adjacent to the rear frame.

4. The battery pack of claim 1, wherein the rear frame comprises a supporting rib extending from an inner wall of the rear frame toward an inside of the tray, wherein the second end portion of the BEM bracket is fastened to the supporting rib.

5. The battery pack of claim 1, wherein a plurality of partition wall grooves are formed in a top surface of each of the at least one module partition wall, wherein the first end portion of the BEM bracket is fastened to bottom surfaces of the plurality of partition wall grooves of the first one of the at least one module partition wall.

6. The battery pack of claim 1, wherein the BEM bracket comprises:
    a pair of first brackets spaced apart from each other in the width direction of the tray; and
    a second bracket comprising a pair of sub-brackets located between the pair of first brackets and a plurality of connecting brackets connecting the pair of sub-brackets.

7. The battery pack of claim 6, wherein first and second opposite end portions of the BEM in the longitudinal direction are respectively fastened to first and second ones of the pair of first brackets.

8. The battery pack of claim 7, wherein the BEM is seated on a seating surface formed by the pair of sub-brackets and the plurality of connecting brackets.

9. The battery pack of claim 1, wherein each of the plurality of battery modules comprises a fixing portion formed on at least one side of the respective battery module.

10. The battery pack of claim 9, wherein the fixing portion of each of the plurality of battery modules is fixed to at least one of the pair of side covers.

11. A vehicle comprising at least one battery pack each according to claim 1.

* * * * *